United States Patent
Scholz et al.

[11] 3,856,103
[45] Dec. 24, 1974

[54] IMPACT-ABSORBING INSTRUMENT PANEL FOR VEHICLES

[75] Inventors: Hansjürgen Scholz, Echterdingen; Luigi Brambilla, Sindelfingen; Rudolf Allgaier, Nagold, all of Germany

[73] Assignee: Daimler-Benz Aktiengesellschaft, Stuttgart, Germany

[22] Filed: Oct. 16, 1972

[21] Appl. No.: 297,848

[30] Foreign Application Priority Data
Oct. 16, 1971  Germany.......................... 2151599

[52] U.S. Cl. ............................. 180/90, 280/150 B
[51] Int. Cl. ........................................ B60r 21/04
[58] Field of Search ..... 180/90; 280/150 B, 150 AB

[56] References Cited
UNITED STATES PATENTS

| | | | |
|---|---|---|---|
| 2,375,567 | 5/1945 | Luton | 180/90 |
| 3,341,248 | 9/1967 | Barenyi | 180/90 X |
| 3,456,572 | 7/1969 | Beyer | 180/90 X |
| 3,498,402 | 3/1970 | Barenyi | 180/90 |
| 3,719,245 | 3/1973 | Wilfert | 180/90 |

FOREIGN PATENTS OR APPLICATIONS

| | | | |
|---|---|---|---|
| 1,088,650 | 10/1967 | Great Britain | 280/150 B |
| 649,989 | 12/1962 | Italy | 280/150 B |

*Primary Examiner*—David Schonberg
*Assistant Examiner*—Terrance L. Siemens
*Attorney, Agent, or Firm*—Craig & Antonelli

[57] ABSTRACT

An impact-absorbing instrument panel for motor vehicles, especially passenger motor vehicles which includes padded parts facing the vehicle interior space that are permanently deformable by an impact of a vehicle passenger caused by an accident; a deformation member constructed as hollow bearer is thereby provided within the impact area of the keens of the driver and co-driver; this deformation member extends approximately rectilinearly over the entire vehicle width and has a rounded-off profile at least on the side facing the vehicle interior space.

22 Claims, 4 Drawing Figures

FIG.1
FIG.2
FIG.3
FIG.4
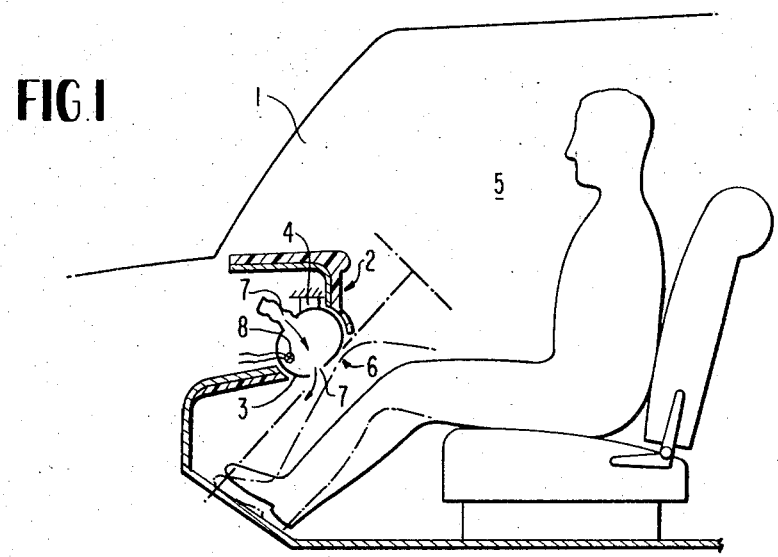
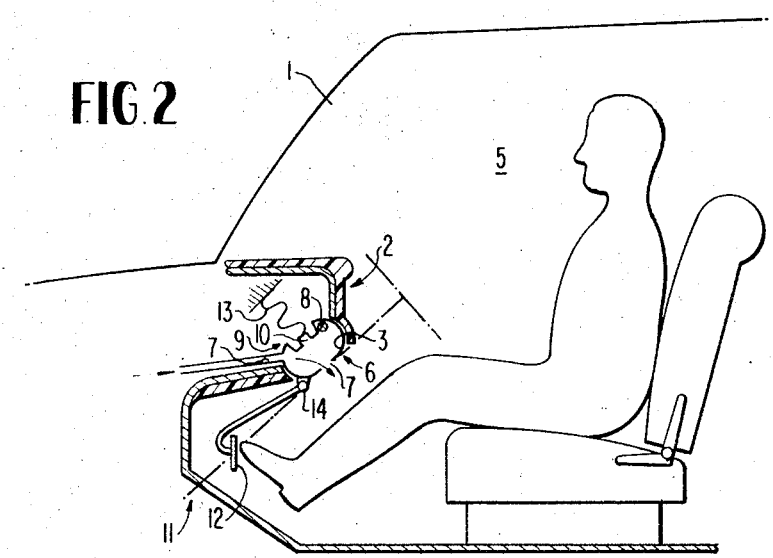
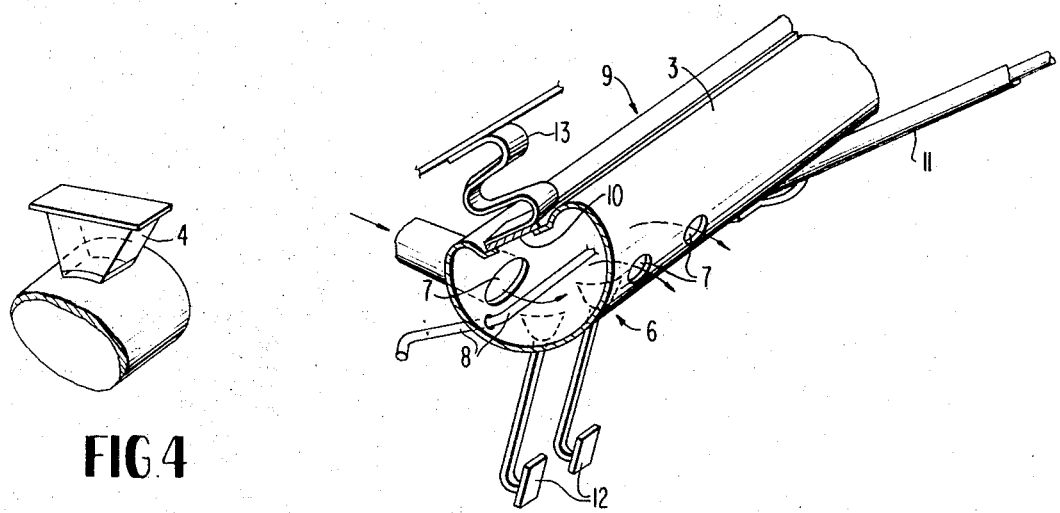

IMPACT-ABSORBING INSTRUMENT PANEL FOR VEHICLES

The present invention relates to an impact-absorbing instrument panel for motor vehicles, especially passenger motor vehicles, which includes padded parts facing the vehicle interior space which are permanently deformable by an impact of a vehicle passenger caused by an accident.

It is known in the art to pad instrument panels with shock-absorbing materials and to embed into this padding material permanently deformable bodies, or to mount the padding material on such bodies. These deformation members, which frequently represent plates made of sheet metal, are limited for the most part only to the forward portions of the instrument panel disposed opposite the front seats and are supported at fixed vehicle parts. By reason of the ducts, lines and Bowden cables which occur in large numbers within these areas, a particularly suitable shape for the deformation members cannot always be selected for space reasons and also for reasons of unfavorable fastening possibilities so that also the attainable effect cannot be considered optimum.

It is the aim of the present invention to provide a readily deformable deformation member which produces the best possible protection for the passengers and which, in particular, is also suited for taking over further functions.

Accordingly, an impact-absorbing instrument panel for motor vehicles, especially passenger motor vehicles, is proposed which includes padded parts which face the vehicle interior space and which are permanently deformable by an impact of a vehicle passenger caused by an accident, whereby according to the present invention a deformation member constructed as hollow bearer and extending approximately rectilinearly over the entire vehicle width is provided within the impact area of the knees of the driver and co-driver, which deformation member includes at least on the side facing the vehicle interior space a rounded-off profile.

In one embodiment according to the present invention, the deformation member is made in one piece. The deformation member, however, may also be securely connected with a closure plate on the side opposite the vehicle interior space.

In one advantageous embodiment of the present invention, the deformation member serves as substitute for a vehicle cross bearer and for the support of the steering and/or bearing support of the pedals.

The tubularly shaped deformation member may also serve as air guide channel if it is provided with apertures for the air inlet and air discharge.

However, it is also possible to permit supply lines to run on the inside of the deformation member.

A simple and safe securing is attained if the deformation member is supported laterally at fixed vehicle parts by way of rigid or also deformable end members.

Accordingly, it is an object of the present invention to provide an impact-absorbing instrument panel for motor vehicles, especially passenger motor vehicles, which avoids by simple means the aforementioned shortcomings and drawbacks encountered in the prior art.

Another object of the present invention resides in an impact-absorbing instrument panel for motor vehicles, especially passenger motor vehicles in which optimum effects are attainable as regards passenger protection.

A further object of the present invention resides in an impact-absorbing instrument panel which is so constructed and arranged as to permit the selection of the most suitable form for the intended purposes.

Still another object of the present invention resides in an impactabsorbing instrument panel for motor vehicles, especially passenger motor vehicles, which permits a simple and safe mounting and fastening thereof while at the same time permitting its use for additional functions.

These and other objects, features and advantages of the present invention will become more apparent from the following description when taken in connection with the accompanying drawing which shows, for purposes of illustration only, two embodiments in accordance with the present invention, and wherein:

FIG. 1 is a schematic longitudinal cross-sectional view through a first embodiment of a one-piece deformation member with rigid lateral fastening means according to the present invention;

FIG. 2 is a schematic longitudinal cross-sectional view through a modified embodiment of a deformation member with a closure plate and with deformable lateral fastening means according to the present invention;

FIG. 3 is a schematic perspective view of a one-piece deformation member with a lateral fastening member according to the embodiment of FIG. 2; and FIG. 4 is a schematic perspective view of one end of a one-piece deformation member having a rigid lateral fastening means according to the embodiment of FIG. 1.

Referring now to the drawing wherein like reference numerals are used throughout the two views to designate like parts, reference numeral 1 designates in both views a passenger motor vehicle which is schematically shown only partially in outlines. A deformation member 3 constructed as hollow bearer extends approximately rectilinearly over the entire vehicle width and is padded by the front end of an instrument panel generally designated by reference numeral 2 within the knee impact area of the forward passengers of the passenger motor vehicle 1. The deformation member 3 according to FIG. 1 is supported at a fixed vehicle part by way of rigid end members 4 as is more clearly illustrated in FIG. 4 and is constructed unitary, i.e., in one piece. Additionally, the deformation member 3 which has a round profile at least on the side 6 facing the vehicle interior space 5, is provided with apertures 7 which serve for the air inlet and/or the air discharge. Supply lines 8 which extend on the inside of the deformation member 3 consisting preferably of sheet metal, lead for example to the indicating instruments (not shown).

In the embodiment according to FIG. 2, the deformation member 3 is provided on the side 9 opposite the vehicle interior space 5 with a closure plate 10 and serves as substitute for a vehicle cross bearer member which otherwise serves customarily for the support and mounting of the steering system 11 as also for the bearing support 14 of the pedals 12. Deformable end members 13, as illustrated in FIG. 3, provide a connection between fixed vehicle parts and the deformation member 3.

While we have shown and described only two embodiments in accordance with the present invention, it is understood that the present invention is not limited thereto but is susceptible of numerous changes and modifications as known to those skilled in the art. Thus, for example, the present invention is not limited to the illustrated embodiment of the deformation member but instead also other deformable profiles can be selected. Hence, we do not wish to be limited to the details shown and described herein but intend to cover all such changes and modifications as are encompassed by the scope of the appended claims.

What we claim is:

1. An impact-absorbing instrument panel for vehicles comprising
a base instrument panel structure in facing relationship to a vehicle interior space, said instrument panel structure being provided with shock-absorbing materials; and
a deformation means for protecting knees of vehicle passengers upon impact with said instrument panel structure,
said deformation means being a hollow bearer member having a rounded profile portion in facing relationship with the knees of vehicle passengers, and said deformation means being provided at said instrument panel structure within an area of impact of the vehicle passenger knees with said instrument panel structure, said deformation means extending approximately over the entire vehicle width.

2. An instrument panel according to claim 1, characterized in that the hollow bearer member of said deformation means is formed in a one-piece closed structure.

3. An instrument panel according to claim 1, characterized in that the hollow bearer member of said deformation means is formed with an opening on a portion opposite said vehicle interior space, said opening being covered by a closure plate securely connected to said deformation means.

4. An instrument panel according to claim 1, characterized in that the deformation means serves as a vehicle cross bearer.

5. An instrument panel according to claim 4, characterized in that the deformation means serves for the support of a steering means.

6. An instrument panel according to claim 5, characterized in that the deformation means serves for the bearing support of pedal means.

7. An instrument panel according to claim 6, characterized in that the deformation means is provided with apertures for air inlet and air discharge.

8. An instrument panel according to claim 7, characterized in that supply lines extend on the inside of the deformation means.

9. An instrument panel according to claim 8, characterized in that the deformation means is laterally supported at fixed vehicle parts by way of end members.

10. An instrument panel according to claim 9, characterized in that said end members are rigid.

11. An instrument panel according to claim 9, characterized in that said end members are deformable.

12. An instrument panel according to claim 9, characterized in that the deformation means is formed in a one-piece closed structure.

13. An instrument panel according to claim 9, characterized in that the deformation means is formed with an opening on a portion opposite said vehicle interior space, said opening being covered by a closure plate securely connected to said deformation means.

14. An instrument panel according to claim 1, characterized in that the deformation means is provided with apertures for air inlet and air discharge.

15. An instrument panel according to claim 1, characterized in that supply lines extend on the inside of the deformation means.

16. An instrument panel according to claim 1, characterized in that the deformation means is laterally supported at fixed vehicle parts by way of end members.

17. An instrument panel according to claim 16, characterized in that said end members are rigid.

18. An instrument panel according to claim 16, characterized in that said end members are deformable.

19. An instrument panel according to claim 1, wherein said instrument panel structure is permanently deformable upon impact.

20. An instrument panel according to claim 1, wherein at least a portion of said deformation means is padded by said shock-absorbing materials of said instrument panel structure.

21. An instrument panel according to claim 1, wherein said hollow bearer member of said deformation means is formed of a rigid material.

22. An instrument panel according to claim 21, wherein said rigid material is sheet metal.

* * * * *